Nov. 13, 1928.

H. FISCHER 1,691,471

ANIMAL POKE

Filed June 17, 1927

INVENTOR.
H. Fischer
BY
James W. Martin
ATTORNEY.

Patented Nov. 13, 1928.

1,691,471

UNITED STATES PATENT OFFICE.

HARRMANN FISCHER, OF RAEVILLE, NEBRASKA.

ANIMAL POKE.

Application filed June 17, 1927. Serial No. 199,475.

The invention relates to animal pokes, and has for its object to provide a device of this character comprising a yoke adapted to encircle the neck of an animal and vertically disposed bars hingedly connected to opposite sides of the yoke and provided with piercing members normally held outwardly by means of coiled springs, and which bars are adapted to engage an obstruction, for instance a wire fence and force the prongs inwardly against the action of the springs when the animal attempts to break through the obstruction.

A further object is to provide opposite sides of the yoke with brackets U-shaped in form and to which are connected the arms of U-shaped brackets carried by the bars.

A further object is to provide the bar brackets with prongs, which prongs extend through registering apertures in opposite sides of the yoke and the U-shaped brackets carried thereby, and positioned whereby upon pivotal movement of the bars said prongs will be forced inwardly into engagement with the neck of the animal against the action of coiled springs.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
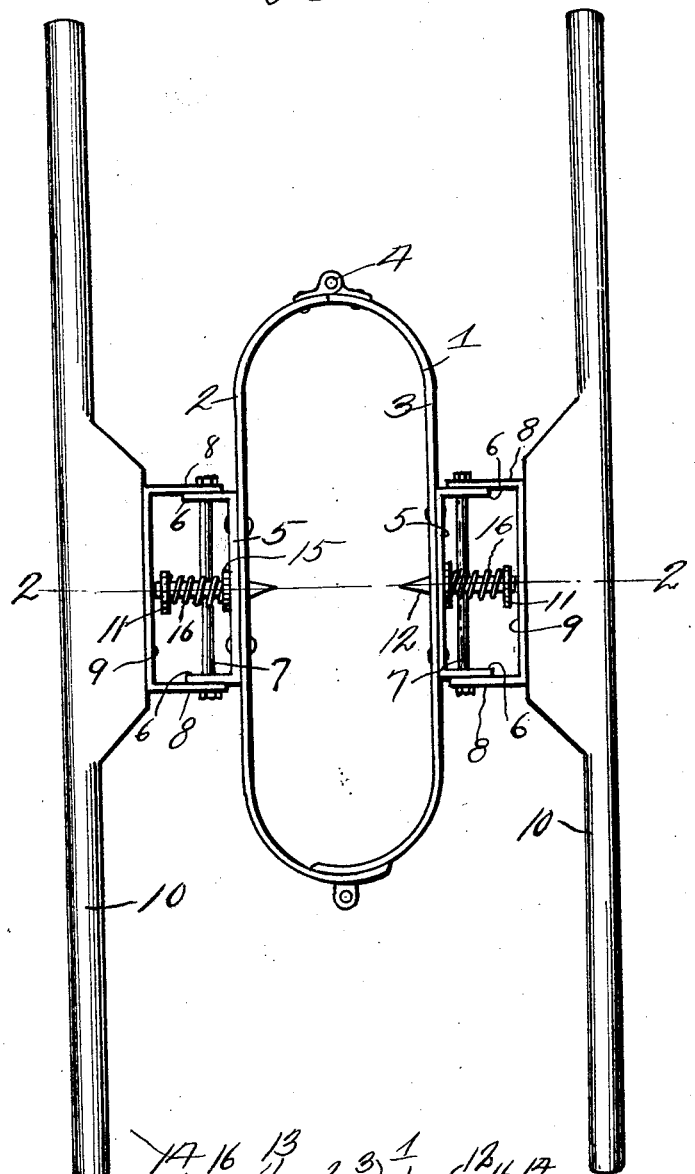
Figure 1 is a view in elevation of the poke.
Figure 2:
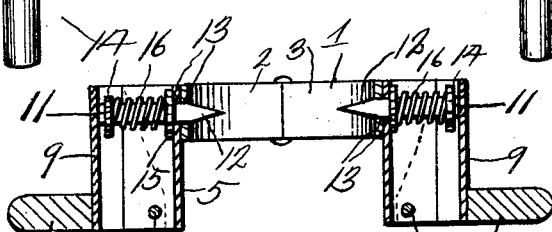
Figure 2 is a horizontal sectional view taken on line 2—2 of Figure 1.

Referring to the drawing the numeral 1 designates the yoke which is formed from sections 2 and 3, hingedly connected at 4, whereby it may be opened for placing the device around the neck of the animal. Secured to the outer sides of the yoke sections 2 and 3 are U-shaped brackets 5, which brackets have their arms 6 outwardly extending. Hingedly connected to the arms 6 by means of pivot bolts 7 are the arms 8 of U-shaped brackets 9, to which brackets are secured in any suitable manner, vertically disposed bars 10, which bars are adapted to engage an obstruction, for instance a fence when the animal attempts to break through the fence or obstruction. The U-shaped members 5 and 9 extend forwardly of the yoke 1 and are hingedly connected together adjacent their forward end whereby upon a rearward movement of the bars 10, the rear portions of the U-shaped members 9 will move inwardly.

Connected to the U-shaped members 9 adjacent their rear ends and at 11 are inwardly extending prongs 12, which prongs extend through registering apertures 13 in the member 2 and 3, and the U-shaped brackets 5, whereby upon an inward movement thereof, they will engage opposite sides of the neck of the animal causing pain, consequently causing the animal to desist in the attempt to break through the fence or obstruction. Surrounding the prongs 12 and interposed between the lugs 14 and the washers 15 on the prongs 12 are coiled springs 16, the expansive force of which normally maintain the U-shaped members 9 in their outer positions, and out of engagement with the neck of the animal, however during a fence breaching operation, when the bars 10 engage the fence, the prongs 12 are forced inwardly, and the springs 16 are compressed.

From the above it will be seen that an animal poke is provided which is simple in construction, positive in operation, and one which may be cheaply manufactured and sold. It will also be seen that the parts are reduced to a minimum, consequently danger of the movable parts getting out of order is reduced to a minimum.

The invention having been set forth what is claimed as new and useful is:—

An animal poke comprising a sectional neck encircling yoke, U-shaped brackets secured to opposite sides of the yoke, obstruction engaging bars at opposite sides of the yoke, U-shaped brackets carried by the bars, said U-shaped brackets of the yoke and bars extending forwardly of the yoke and hingedly connected together adjacent their forward sides, prongs carried within the bar brackets and extending inwardly through the yoke brackets and opposite sides of the yoke and springs surrounding said prongs and forming means for normally forcing the bar brackets outwardly and maintaining the prongs in inoperative positions.

In testimony whereof I hereunto affix my signature.

HARRMANN FISCHER.